(12) United States Patent
Chu et al.

(10) Patent No.: US 7,120,392 B2
(45) Date of Patent: Oct. 10, 2006

(54) UPLINK POWER CONTROL USING LOOPBACK COMMUNICATIONS CARRIERS

(75) Inventors: Jeffrey C. Chu, Los Altos, CA (US); Michael L. Downey, Fremont, CA (US)

(73) Assignee: Glowlink Communications Technology, Inc., Los Altos, CA (US)

( * ) Notice: Subject to any disclaimer, the term of this patent is extended or adjusted under 35 U.S.C. 154(b) by 72 days.

(21) Appl. No.: 10/684,147

(22) Filed: Oct. 9, 2003

(65) Prior Publication Data

US 2004/0127157 A1 Jul. 1, 2004

Related U.S. Application Data

(60) Provisional application No. 60/417,874, filed on Oct. 11, 2002.

(51) Int. Cl.
*H04B 1/00* (2006.01)
*H04B 7/00* (2006.01)

(52) U.S. Cl. .................. 455/69; 455/522; 455/515; 455/67.11

(58) Field of Classification Search ............... 455/69, 455/522, 515, 517, 67.11, 68, 115.1, 9, 13.4, 455/15, 11.1, 13.2, 13.1, 67.14, 12.1, 427, 455/428, 429, 24; 370/316, 335, 347
See application file for complete search history.

(56) References Cited

U.S. PATENT DOCUMENTS

| | | | |
|---|---|---|---|
| 4,941,199 A | 7/1990 | Saam | |
| 5,265,119 A * | 11/1993 | Gilhousen et al. | 455/522 |
| 5,574,974 A | 11/1996 | Almgren et al. | |
| 5,687,195 A | 11/1997 | Hwang et al. | |
| 5,708,681 A | 1/1998 | Malkemes et al. | |
| 5,731,993 A | 3/1998 | Wachs et al. | |
| 5,881,096 A | 3/1999 | Majkrzak et al. | |
| 6,128,353 A | 10/2000 | Ho et al. | |
| 6,222,878 B1 | 4/2001 | McCallister et al. | |
| 6,334,047 B1 * | 12/2001 | Andersson et al. | 455/69 |
| 6,336,030 B1 * | 1/2002 | Houston et al. | 455/13.2 |
| 6,374,085 B1 * | 4/2002 | Saints et al. | 455/69 |
| 6,418,164 B1 | 7/2002 | Endres et al. | |
| 6,549,755 B1 | 4/2003 | Chu et al. | |
| 6,594,501 B1 * | 7/2003 | Black et al. | 455/522 |
| 6,628,956 B1 * | 9/2003 | Bark et al. | 455/522 |
| 6,708,029 B1 * | 3/2004 | Wesel | 455/428 |
| 6,898,193 B1 * | 5/2005 | Saifuddin | 455/522 |

FOREIGN PATENT DOCUMENTS

| | | |
|---|---|---|
| EP | 0 844 805 A1 | 5/1998 |
| WO | WO-02/091627 A1 | 11/2002 |

* cited by examiner

*Primary Examiner*—Edward F. Urban
*Assistant Examiner*—John J. Lee
(74) *Attorney, Agent, or Firm*—Derek J. Westberg

(57) ABSTRACT

A method for providing power control to a uplink signal, comprising an uplink station transmitting an uplink signal to a satellite. The satellite also transmits a loopback signal representing the received uplink signal back to the uplink station. The satellite also transmits a beacon signal to the uplink station. The uplink station adjusts the power of the uplink signal based on measurements of the beacon signal and the uplink signal.

34 Claims, 6 Drawing Sheets

UPLINK POWER CONTROL USING LOOPBACK COMMUNICATIONS CARRIERS

This application claims the benefit of U.S. Provisional Patent Application No. 60/417,874 filed Oct. 11, 2002. Application No. 60/417,874 is hereby incorporated by reference in its entirety.

FIELD OF THE INVENTION

Maintaining received power level of carrier signals being transmitted through a wireless channel.

BACKGROUND OF THE INVENTION

Information is sent via a communication channel. A transmitter may communicate the information by modulating a carrier signal (e.g., a wireless carrier). A receiver may demodulate the carrier signal to recover the information. The carrier signal must have sufficient power to ensure that the receiver can demodulate the carrier signal. An example of a carrier signal is an uplink communications carrier signal which may be sent from a transmit terminal at an uplink station to a space based satellite which may then retransmit the signal via downlink communication carrier signal to a receive terminal at a receive station.

Wireless carriers are subject to fluctuating received power levels due to changes in atmospheric conditions. For example, in satellite communications, transmitted carriers can be affected by changes in the atmospheric conditions on both sides of the communication link (earth to satellite and satellite to earth). This is shown in FIG. 1, which shows the variation in attenuation that a 27 GHz and a 20 GHz carrier signal may experience over time. Atmospheric changes maybe caused by rain, snow, hail, ice, clouds and moisture. In many instances, these changes can cause significant degradation to the received power level of the carrier signals (such as the uplink signal) and result in poor quality of reception.

The most common approach to correct for the received power level problem is to monitor a non-communications signal and then adjust the transmit carrier power based on the measured degradation in such a non-communications signal. As in the example above the space based satellite may send the non-communication signal (such as a beacon signal, or a pilot tone) to a receive terminal at the uplink station. Although this method can sometimes be effective, degradation that is experienced by the non-communication signal does not always correlate well with degradation experienced by the uplink carrier signals. In addition, fluctuations experienced by carriers in a wireless channel can be highly unpredictable and rapid, causing the power control scheme to lag significantly behind the signal degradation, thus rendering power corrective actions ineffective.

BRIEF SUMMARY OF THE INVENTION

One aspect of the invention is a method of controlling a first signal that is being transmitted from a first station to a second station. The method utilizes a closed feedback loop and an open control loop for controlling the performance of the first signal. The closed feedback loop and the open control may be implemented separately or in combination. The closed feedback loop and/or the open control loop may take into account historical measurement data.

The open control loop may utilize a non-communication signal (such as a beacon or a pilot) transmitted from the second station to the first station. The performance of the non-communication signal may indicate the performance of the first signal as received by the second station. The first station may perform a first measurement of the performance of the non-communication signal and use the first measurement in the open control loop in an effort to control the performance of the first signal as received by the second station. This is an open control loop as the first measurement is an indirect measure of the performance of the first signal as received by the second station.

The closed feedback loop may utilize a loopback communication signal. The second station may transmit the loopback communication signal to the first station. The loopback communication signal comprises a retransmission of the first signal as received by the second station. The first station may perform a second measurement of the performance of the loopback signal. The first station may utilize the second measurement in the closed feedback control loop. This is a closed feedback loop as the second measurement is a direct measure of the first signal as received by the second station.

Both control loops may be utilized repeatedly in an effort to control the performance of the first signal. Both control loops may control the first signal independently or in sequence. The efforts of both control loops may be combined as explained herein. Each control loop may take into account a historical record of measurements that each control loop has made.

DETAILED DESCRIPTION OF THE INVENTION

To alleviate the problems with power control as practiced in the prior art, we have developed a method for effective power control of a communication signal. This power control may be of a signal transmitted from a ground station to a satellite or of a signal transmitted from a satellite to a ground station (or to another satellite). Further, while the invention is primarily directed towards satellite communications, it may be applied to transmission of communication signals in other environments. This approach combines the real-time monitoring results of a loopback communications carrier signal with those of the non-communications signals (e.g., satellite beacon and pilot signals in satellite based communications) as indicators for determining the proper amount of transmit power adjustment. Loop-back carriers are defined as those carriers that can be received at their transmit location (e.g., they are sent from a ground station to a satellite and then returned from the satellite to the ground station). In addition, this approach may utilize data from past received power measurements or other performance parameter (such as energy per bit to noise power spectral density ratio (Eb/No)) in a weighted fashion for determining the amount of adjustment.

Figure 1:
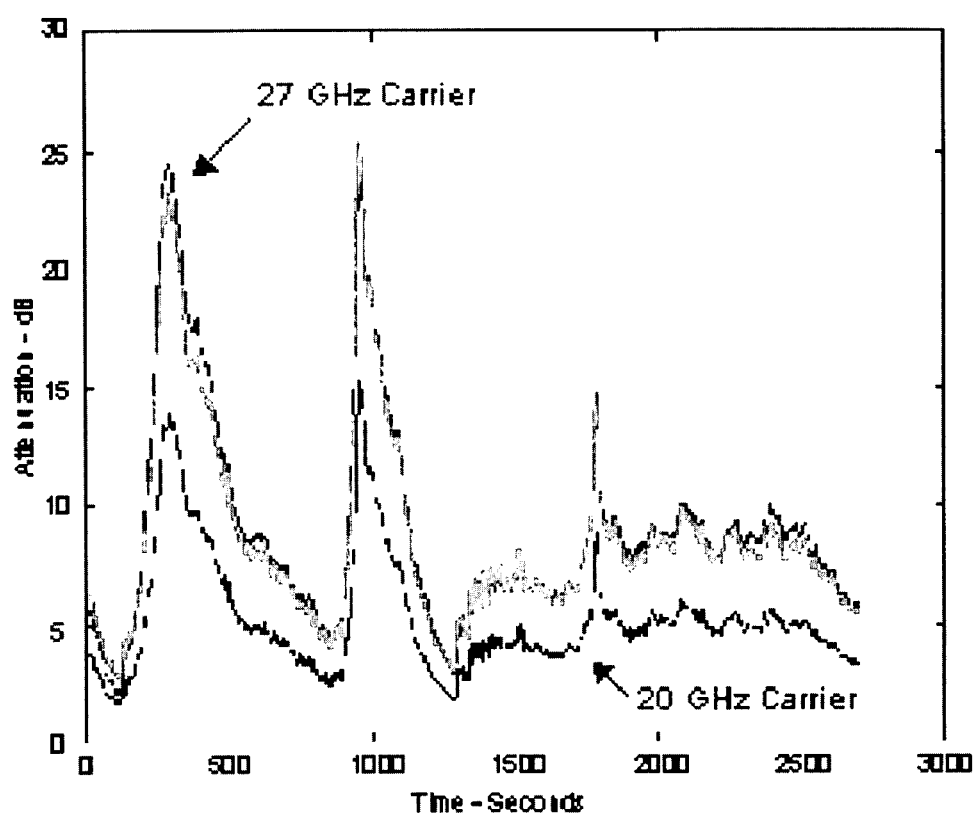
FIG. 1 shows attenuation of a carrier due to atmospheric changes.
Figure 2:
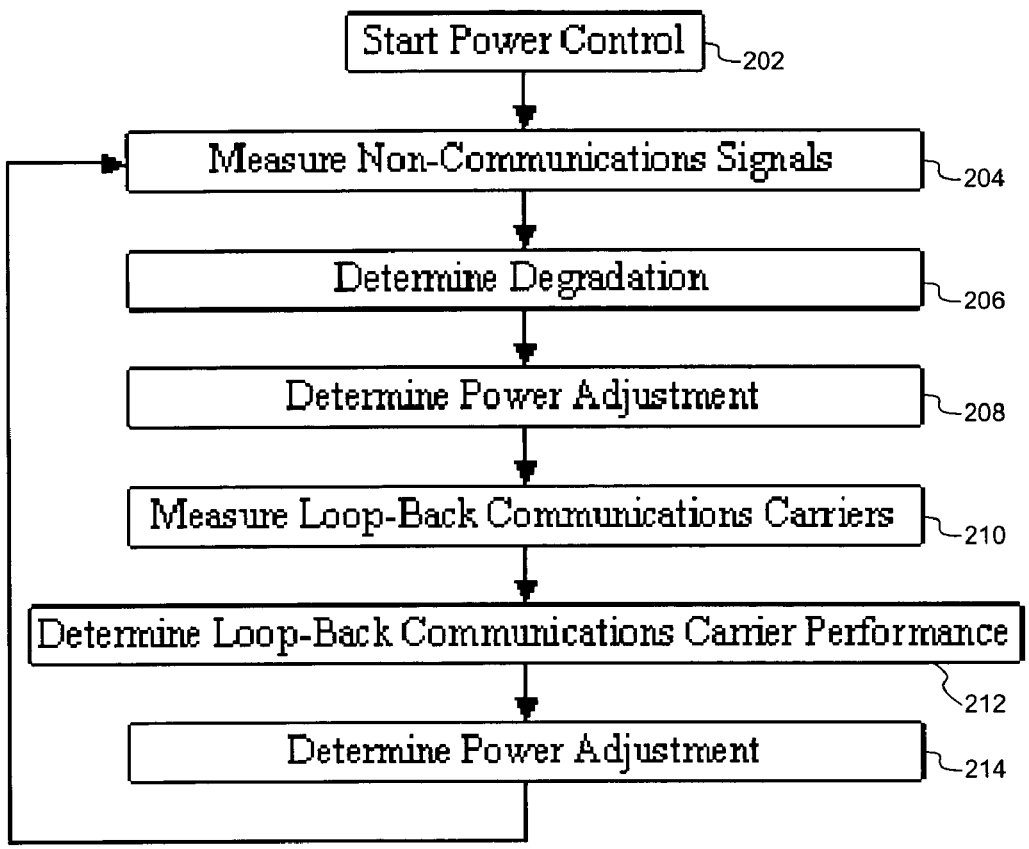
FIG. 2 is a high-level block diagram of an embodiment the invention.

FIG. 2 shows a high-level block diagram of a power control method 200 in accordance with one embodiment of the invention. A first step 202 is starting the power control method 200, which may involve initializing parameters, systems and/or algorithms. A step 204 is to measure one or more non-communication signals. Examples of the non-communication signals are: pilot signals, beacon signals, and other signals that may be transmitted along with the communication signal. A step 206 is to determine how much the non-communication signals have degraded. This may be accomplished by comparing a parameter associated with the non-communication signals and a nominal value of said parameter. Examples of said parameter might be: received power level; Eb/No; etc. The use of Eb/No as the parameter associated with the non-communication signal assumes that the non-communication signal is digitally modulated. A step 208 is to determine how the power of the communication signal should be adjusted based on results from step 206 and possibly from a past record of the results from step 206.

A step 210 is to measure a loop-back communication signal. A step 212 may be to determine a performance of the loop-back communication signal by characterizing a degradation of the loop-back signal. A step 214 is to determine the power adjustment for the communication signal using the results of the step 212 and possibly from the past results to the step 212. Finally, steps 204–214 are performed repeatedly.

In one aspect, our approach comprises two distinct elements: (1) utilization of loop-back communications carriers for power control (steps 210–214) in addition to the utilization of non-communications signals such as beacon and/or pilot signals (steps 204–208); and (2) a technique in which carrier transmit power adjustments are determined based on prior measured performance and/or prior power adjustments (steps 208 and 214). These elements may be implemented separately or in combination.

Two transmit power adjustment steps (208 and 214) are shown in FIG. 2. Thus, the method may alternate between: (208) determining a power adjustment in response to measured performance of a non-communications signal; and (214) determining a power adjustment in response to a measured performance of a communications signal. The results of these alternating steps may be time-averaged (e.g., by using a weighting function) such that each power adjustment is based on prior power adjustments and/or prior measured performance (of either or both of the communication signal and the non-communication signal).

It will be apparent that modifications to the method as illustrated in FIG. 2 may be made. For example, multiple power adjustments may be performed in response to measurements of a non-communications signal between adjustments made in response to measurements of the communication signal. Similarly, multiple power adjustments may be made in response to measurements of the communications signal between adjustments made in response to measurements of the non-communications signal. Depending on the circumstances, it may be advantageous to adjust power based only on the communications signal performance, where each adjustment is made based on current and past measurements in a time-averaged fashion. Similarly, power may be adjusted based only on performance of the non-communications signal in a time-averaged fashion.

Alternatively, measurements of the communications signal and the non-communications signal may be performed between power adjustments. In this case, the power adjustments may be made based on combining both sets of measurements, along with prior measured performance and/or prior power adjustments.

In one aspect, the invention combines the measurement of the loop-back communications carriers received performance parameters (received power level, Eb/No, etc.) for verifying the power adjustment made based just on the measurement of the non-communication signal. Thus, this method may make an initial adjustment based on the non-communication signal measurement. Then, it will automatically measure the effect on the communications carrier, and make a further adjustment based on the measured received performance parameter on the transmit power level for the carrier.

Thus, an embodiment of the invention is a method of using two independent loops to measure two different signals to maintain the performance of one or more uplink communications traffic carriers. An aspect of the method, is to use one of the loopback communications carriers to verify that any applied power control adjustments are actually maintaining carrier performance. One problem with only using the non-communications carriers, for uplink control as in the prior art, is that there is no verification that the carriers are actually receiving the correct power adjustment. Some of these problems with the method for uplink power control as practiced in the prior art arise due to the satellite beacon being at a very different frequency than the traffic that is being controlled. In some instances, there is very little correlation between the beacon fluctuations and the fluctuation experienced by the traffic carriers when they are at distinctly different frequencies.

The invention, overcomes the above problem by actually measuring and verifying that the power adjustments made by the beacon are correct. This is accomplished by measuring the performance of the loopback carrier that is under power control. If the performance of the loopback carrier is not being properly adjusted by the beacon power control loop, then the invention adjusts the power level until the loopback carrier's performance is operating as expected.

Figure 3:
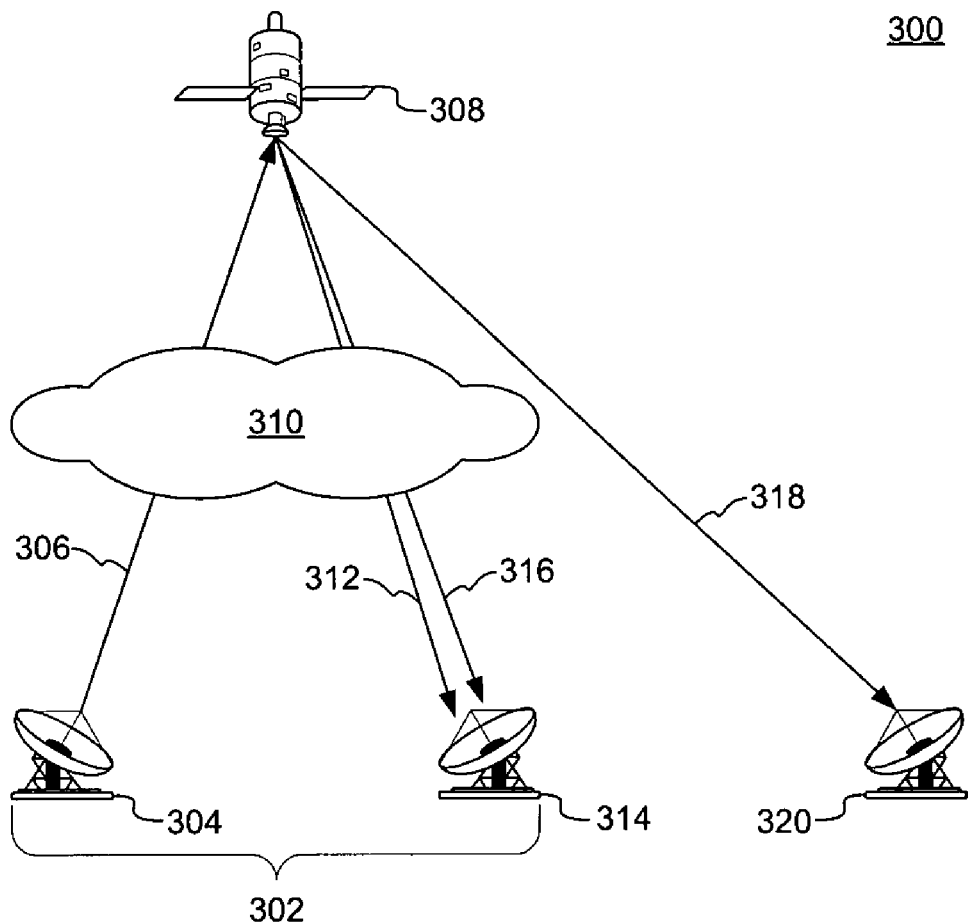
FIG. 3 is an illustration of a system in which an embodiment of the invention may be employed.

FIG. 3 is an example of a communication system 300 in which an embodiment of the invention may be implemented. The communication system 300 is a space satellite communication system but the invention is applicable to any system communication system that includes a receiver, a transmitter, and a communication medium in which the attenuation varies with time. An uplink station 302 uses a transmit terminal 304 to transmit an uplink signal 306 to a satellite 308. Preferably, the uplink signal 306 reaches the satellite 308 with enough power to ensure that the satellite 308 can interpret the uplink signal 306. Therefore, the uplink signal 306 is transmitted with enough power to ensure that it overcomes any attenuation associate with a transmission medium. For example, the transmission medium may be affected by atmospheric conditions 310 such as rain, snow, hail, ice, clouds, pollution and moisture. The attenuation caused by these conditions 310 varies over time. Thus, one goal of the present invention is to overcome said variable transmission medium.

An aspect of the invention is the transmission of a non-communication signal 312 from the satellite 308 to a receive terminal 314. The receive terminal 314 may be connected to, and/or included with the uplink station 302 and may be substantially co-located with the transmit terminal 304. Examples of the non-communication signal 312 are a beacon signal or a pilot signal that do not have the same carrier frequency as the uplink signal 306.

An aspect of the invention is for the uplink station 302 to compare the measured value of the non-communication signal 312 to a nominal value. This assumes that the attenuation experienced by the non-communication signal 312 is related to the attenuation experienced by the uplink signal 306. Therefore, the uplink station 302 adjusts the power of the uplink signal 306 to compensate for attenuation variations seen in the non-communication signal 312.

Unfortunately, attenuation variations experienced by the non-communication signal are not always the same as the attenuation variations experienced by the uplink signal 306. Thus, a further aspect of the invention is the transmission of a loopback signal 316 which may be sent from the satellite 308 to the receive terminal 314 of the uplink station 302. The loopback signal 316 is substantially identical to the uplink signal 306 as received by the satellite 308. The loopback signal 316 has a substantially similar carrier frequency as the uplink signal 306 and experiences substantially similar attenuation as the uplink signal 306. Thus provides a good indication of the attenuation experienced by the uplink signal 306.

The satellite 308 may also retransmit the uplink signal 306 as a downlink signal to a receive terminal at a downlink station 320.

Figure 4:
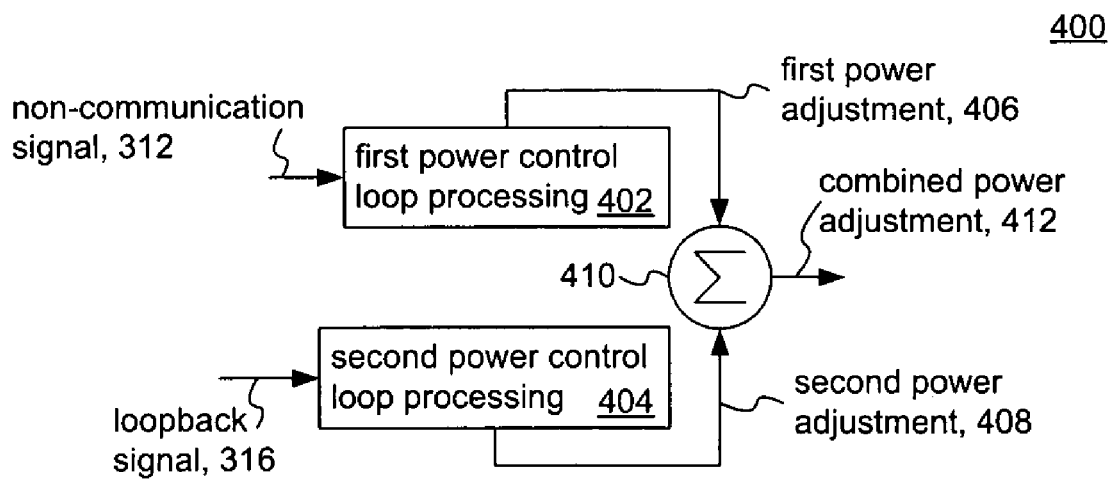
FIG. 4 is a block diagram of a system in accordance with an embodiment of the invention.

FIG. 4 is a block diagram of a system 400 in accordance with an embodiment of the invention. The system 400 is located at and/or connected to the uplink station 302 with the goal of maintaining the power and/or performance of the uplink signal 306 as received by the satellite 308 at a constant level despite any variation in attenuation due to atmospheric conditions 310 that the uplink signal 306 may experience. The system 400 includes a first power control loop block 402 and a second power control loop block 404. The first power control loop block 402 makes measurements of the non-communication signal 312 to formulate a first power adjustment 406. The second power control loop block 404 makes measurements of the loopback signal 316 to formulate a second power adjustment 408. The first power adjustment 406 and the second power adjustment 408 are combined in a summing block 410 to formulate a combined power adjustment 410, which is applied to the uplink signal 306.

The first power control loop block 402 and the second power control loop block 404 may operate independently. The power control loop blocks 402 and 404 may sample the signals 312 and 316 at the same rate or at different rates. The power control loop blocks 402 and 404 may also formulate adjustments 406 and 408 at the same rate or different rates. These rates may be independent of the rates at which the signals 312 and 316 are measured.

For example, the first block 402 might formulate power adjustments at a rate of once per second. The second block 404 might formulate power adjustments at a rate of once every 5 seconds. The numbers stated here serve only as examples, and are likely to be adjusted based on parameters such as transmit frequency and look angle of the satellite antenna.

Since the loops 402 and 404 may run at different rates it is possible for either of the adjustments 406 or 408 to be zero at the instance that the combined power adjustment 412 is calculated during the summing block 410.

In an alternate embodiment of the invention, block 410 is skipped and the combined power adjustment 412 is not calculated. Instead both power adjustments are applied to the uplink signal in series or in parallel. The second power control loop 404 may be used to verify performance and to make additional power adjustments if necessary.

The first power control loop block 402 includes two functions: one that estimates a non-communication signal level; and another that formulates a first power adjustment 406. The signal level of the non-communication signal is representative of the performance of the non-communication signal 312.

The following equation may be used to estimate the non-communication signal level at a time n, as in step 204 of FIG. 2 and block 402 of FIG. 4.

$$B(n) = \sum_{k=0}^{M-1} W(k)b(n-k) \qquad \text{(Eqn. 1)}$$

Where,

B(n) is an estimated non-communication signal level at time n;

W(k) are a set of M weighting factors of a trend filter W;

b(n−k) are M discrete measurement samples of the non-communication signal 312 at time (n−k); and M is a number of points in the trend filter W.

The value b(x)=is a measurement of the non-communication signal at a time x. When x is greater then or equal to zero then b(x) is a sample of the non-communication signal 312 at time x. When x is less then zero then b(x) is typically set to a reference level or to the expected level of the non-communication signal. This reference level is often referred to as the "blue-sky" signal level.

$$b(x) \equiv \begin{cases} x \geq 0 & \text{the sample of the non-communication signal at time } x \\ x < 0 & \text{the reference level} \end{cases} \qquad \text{(Eqn. 2)}$$

The trend filter W is normalized such that $$\sum_{k=0}^{M-1} W(k) = 1 \qquad \text{(Eqn. 3)}$$

An estimate of the non-communication signal 312 may be calculated by calculating a weighted average of a plurality of measurements of the non-communication signal. The plurality of measurements may be power, noise or some other performance metric of the non-communication signal 312.

In one form, the weights can be set to all the same value, which would represent a simple average of the M samples. In a preferred embodiment of the invention, the weights will actually be unequal and will be disproportionately weighted toward the newest measured samples. This form of filter is referred to as a "forgetting filter", because it weights the oldest samples lightly and the newest samples more heavily. The formulation of this filter has been designed so that the power control loop is responsive to fade changes, but at the same time, provides some averaging of the potentially varying input samples. Examples of possible disproportionately weighting schemes are linear, non-linear or exponential.

The following equation may be used for formulating the power adjustment:

$$\Delta P_1 = B(n-1) - B(n) \quad \text{(Eqn. 4)}$$

Where, $\Delta P_1$ is the calculated first power adjustment 406.

$B(n-1)$ is a previous non-communication signal level estimate.

$B(n)$ is the current non-communication signal level estimate.

At time n=0, the value of $B(n-1)$ is undefined and is typically set to a reference level or to the expected level of the beacon. This reference level is often referred to as the "blue-sky" signal level.

The first power adjustment 406 may be equal to a previous estimate of the non-communication signal 312 minus a current estimate of the non-communication signal 312. The first power adjustment may be calculated in step 208 of FIG. 2 or by the block 402 of FIG. 4

The estimating step and the formulating step may be combined into one step. In which case the following equation may be used for formulating the power adjustment.

$$\Delta P_1 = \sum_{k=0}^{M-1} W(k)[b(n-k-1) - b(n-k)] \quad \text{(Eqn. 5)}$$

Figure 5A:
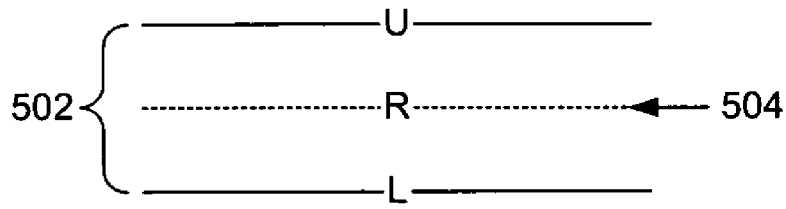
FIGS. 5A–G are illustrations of dead zones and how they might be employed in an embodiment of the invention.
Figure 5B:
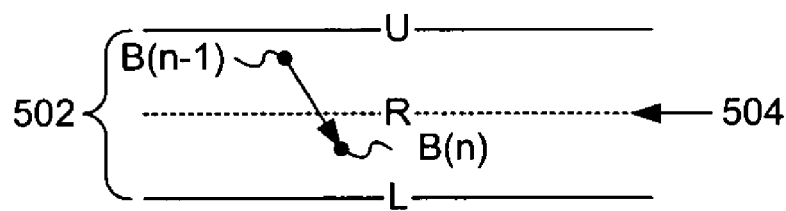
Figure 5C:
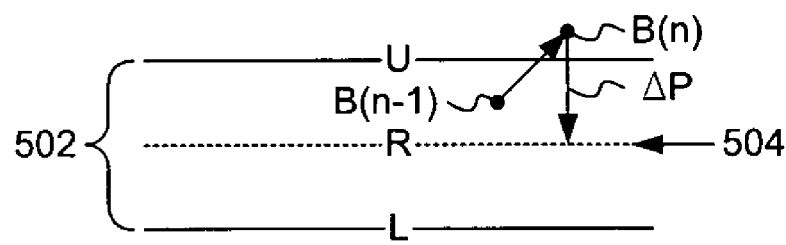
Figure 5D:
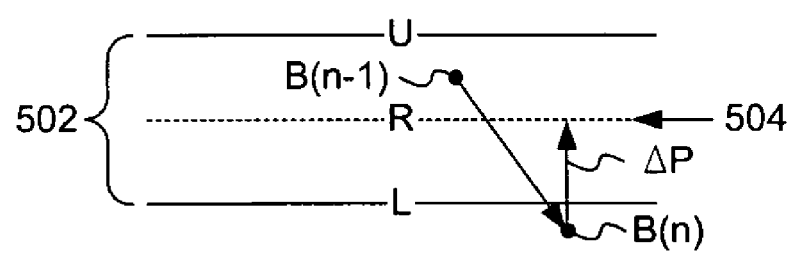
Figure 5E:
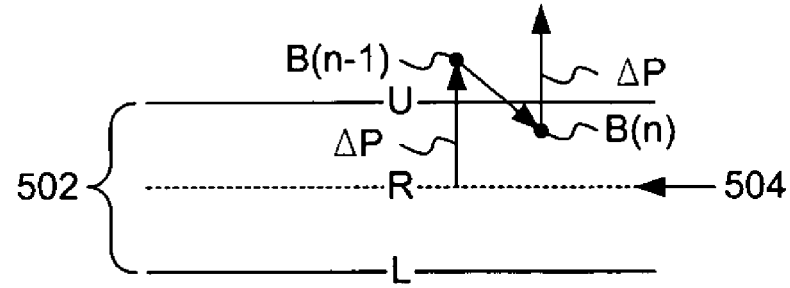
Figure 5F:
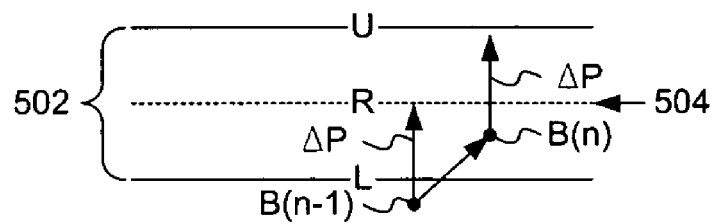
Figure 5G:
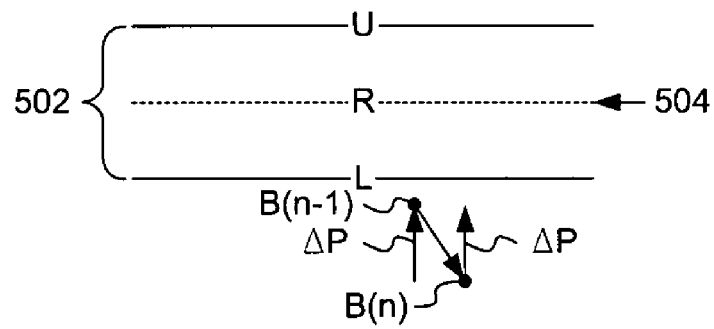

In a preferred embodiment of the invention, a "no adjust" region 502 or "dead zone" is incorporated in to the adjustment criteria of step 208 of FIG. 2 and the block 402 of FIG. 4. FIG. 5A is an illustration of the no adjust region 502. The no adjust region 502 is a region above and below a blue sky reference level 504 wherein no power adjustments are made. For example, if the estimated signal level falls within the no adjust region 502 then no power adjustment is applied to the uplink signal 306.

In the formulas below a letter "R" is defined as the blue sky reference level 504. A letter "U" is defined as the upper bound of the no adjust region 502. A letter "L" is defined as the lower bound of the no adjust region 502.

An embodiment of the invention may employ the following rules 1–4, in place of equations 4 or 5. $B(n)$ and $B(n-1)$ may be calculated using Equation 1. These rules may be practiced by block 402 of FIG. 4 or during step 208.

$$((L \leq B(n) \leq U) \wedge (L \leq B(n-1) \leq U)) \Rightarrow \Delta P_1 = 0 \quad \text{(Rule 1)}$$

Rule 1 states that if $B(n)$ and $B(n-1)$ are both within the no adjust region 502, then $\Delta P_1 = 0$ and no adjustment is made.

$$((B(n)<L) \vee (B(n)>U)) \wedge (L \leq B(n-1) \leq U)) \Rightarrow \Delta P_1 = R - B(n) \quad \text{(Rule 2)}$$

Rule 2 states that if $B(n)$ is outside the no adjust region 502 and $B(n-1)$ is inside the no adjust region 502 then $\Delta P_1 = $ reference level $- B(n)$. This situation represents the non-communication signal 312 moving outside the no adjust region 502.

$$((L \leq B(n) \leq U) \wedge ((B(n-1)>U) \vee (B(n-1)<L))) \Rightarrow \Delta P_1 = B(n-1) - R \quad \text{(Rule 3)}$$

Rule 3 states that if $B(n)$ is inside the no adjust region 502 and $B(n-1)$ is outside the no adjust region 502 then $\Delta P_1 = B(n-1) - $ reference level. This situation represents the non-communication signal 312 moving inside the no adjust region 502.

$$(((B(n)<L) \wedge (B(n)>U)) \vee ((B(n-1)<L) \vee (B(n-1)>U))) \Rightarrow \Delta P_1 = B(n-1) - B(n) \quad \text{(Rule 4)}$$

Rule 4 states that if $B(n)$ and $B(n-1)$ are outside the no adjust region 502 then use equation 4.

In summary:

if $B(n)$ and $B(n-1)$ are both within the no adjust region 502, then $\Delta P_1 = 0$;

else if $B(n)$ is outside the no adjust region 502 and $B(n-1)$ is inside the no adjust region 502 then $\Delta P_1 = $ reference level $- B(n)$;

else if $B(n)$ is inside the no adjust region 502 and $B(n-1)$ is outside the no adjust region 502 then $\Delta P_1 = B(n-1) - $ reference level.

else if $B(n)$ and $B(n-1)$ are outside the no adjust region 502 then $\Delta P_1 = B(n-1) - B(n)$.

An advantage of the method outlined above is that it produces unbiased power control results when performing uplink power control when using a non-communication signal and a dead zone.

In an embodiment of the current invention is the second power control loop 404, which determines a second power adjustment 408 based on measurements of the loopback signal 316.

Equation 6 is a representation of how the second power adjustment 408 may be calculated during the step 214 of FIG. 2 and/or by the block 404 of FIG. 4:

$$\Delta P_2 = CP_p - CP_m \quad \text{(Eqn. 6)}$$

Where, $\Delta P_2$ is the second power adjustment 408;

$CP_p$ is a planned or a desired performance of the loopback signal 316; and $CP_m$ is a currently measured performance of the loopback signal 316.

Figure 6A:
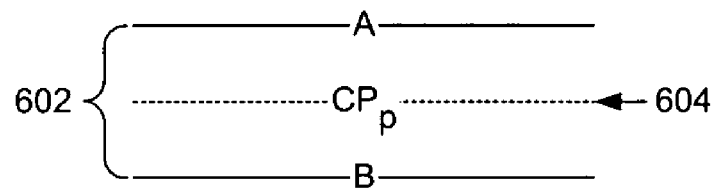
FIGS. 6A–C are illustrations of a dead zone and how it might be used in an embodiment of the invention.

This may be used to maintain the mean level of the uplink signal 306 at a desired level. A drawback of this is the potential for introducing noise into the uplink signal 306. A source of such noise might be rapid variations in $CP_m$, such as from atmospheric scintillation, or due to a delay between the time that $CP_m$ is measured and the time at which the uplink signal is adjusted. To compensate for these possible errors, the second power adjustment 408 is preferably based not only on the magnitude of the error (difference from the planned or desired performance level), but also on the direction of the error. FIG. 6A is an illustration of a "no-adjust" region 602 (i.e. "dead zone") that may be employed as part of the loopback adjustment criteria of a preferred embodiment of the invention. The no adjust region 602 is a region above and below a desired value 604 wherein no adjustment are made. The value 604 is $CP_p$. The letter "A" represents an upper bound of the no adjust region 602. The letter "B" represents a lower bound of the no adjust region 602. The region above A is an "ABOVE" region. The region below B is a "BELOW" region.

The following rules 5–9 may be used to implement a no adjust region to determine a power adjustment based on the performance of the loopback signal 316 as in step 214 of FIG. 2 or by block 404 of FIG. 4.

$$B \leq CP_m(n) \leq A \Rightarrow \Delta P_2 = 0 \quad \text{(Rule 5)}$$

Figure 6B:
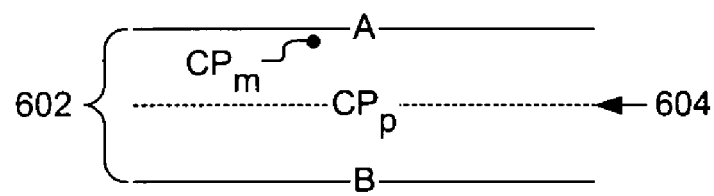

Rule 5 states if $CP_m(n)$ is within the no adjust region 602 as shown in FIG. 6B, then $\Delta P_2 = 0$ $$(CP_m(n)<B) \wedge (B \leq CP_m(n-1)) \Rightarrow \Delta P_2 = (CP_p - CP_m(n))$$
$$* W_1 \qquad \text{(Rule 6)}$$

Figure 6C:
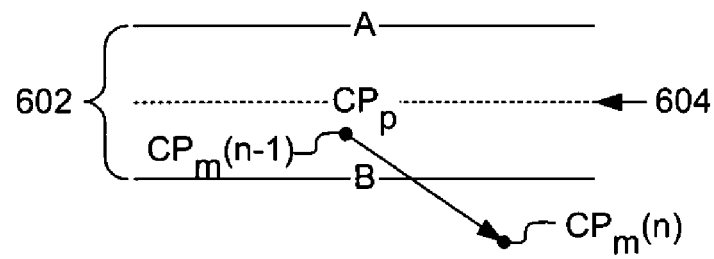

As stated in rule 6 if $CP_m(n)$ is in the BELOW region and $CP_m(n-1)$ is within the no adjust region 602 or the ABOVE region as shown in FIG. 6C, then the second power adjustment would be equal to a difference between the desired value and the measured value times a first weighting factor.

$$(CP_m(n)<B) \wedge (CP_m(n-1)<B) \wedge (B \leq CP_m(n-2)) \Rightarrow \Delta P_2 =$$
$$(CP_p - CP_m(n)) * W_2 \qquad \text{(Rule 7)}$$

Figure 6D:
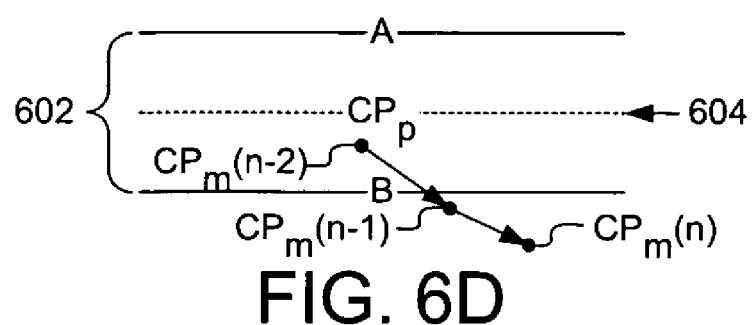

As stated in rule 7 if $CP_m(n)$ and $CP_m(n-1)$ are in the BELOW region and $CP_m(n-2)$ is within no adjust region 602 or the ABOVE region as shown in FIG. 6D, then the second power adjustment is equal to a difference between the desired value and the measured value times a second weighting factor.

$$\left(\bigwedge_{k=0}^{N-1} (CP_m(n-k) < B)\right) \wedge (B \leq CP_m(n-N)) \Rightarrow \Delta P_2 = \qquad \text{(Rule 8)}$$
$$(CP_p - CP_m(n)) * W_N$$

Rule 8 is an extension of the rules 6 and 7 to N steps. Rule 6 is rule 8 if N=1. Rule 7 is rule 8 if N=2. If $CP_m(n)$, $CP_m(n-1), \ldots, CP_m(n-N-1)$ are in the BELOW region and $CP_m(n-N)$ is within no adjust region 602 or the ABOVE region, then the second power adjustment is equal to a difference between the desired value and the measured value times an Nth weighting factor.

In addition, a rule may be formulated to apply to the case of $CP_m(n)$ being in the ABOVE region.

$$\left(\bigwedge_{k=0}^{N-1} (CP_m(n-k) > A)\right) \wedge (A \geq CP_m(n-N)) \Rightarrow \Delta P_2 = \qquad \text{(Rule 9)}$$
$$(CP_p - CP_m(n)) * W_N$$

Rule 9 essentially states that if $CP_m(n)$, $CP_m(n-1), \ldots, CP_m(n-N+1)$ are in the ABOVE Region and $CP_m(n-N)$ is within no adjust region 602 or the BELOW region, then the second power adjustment is equal to a difference between the desired value and the measured value times an Nth weighting factor.

In an embodiment of the invention, N is equal to 3, and weights, W, may be assigned the following values, $W_1=0.25$, $W_2=0.5$, $W_3=1$. This embodiment would employ the above rules for N=1, 2 and 3.

An embodiment of the invention that incorporates features of rules 8 and 9 would be less susceptible to noise then a method following equation 6. The reason is that only correlated directional changes will be significantly adjusted for. In other words, if the measured loopback signal is persistently in a particular region, the power control loop will quickly compensate for the bias. When the measured performance of the loopback carrier is constantly changing regions, the magnitude of the power changes will be very small (if not zero).

It is important to note, that although we are applying the loopback control technique for uplink power control, it is actually a formulation of closed loop link power control. The formulation described above can also be applied to any situation where closed loop link power control can be achieved.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing form the spirit and scope of the invention.

What is claimed is:

1. A system for providing performance control of a first signal transmitted by a first station to a second station, comprising:
   a means for measuring a performance parameter of a second signal that is transmitted to the first station from the second station;
   a means for measuring a performance parameter of a third signal that is transmitted to the first station from the second station and is representative of the first signal as received by the second station;
   a means for performing a first adjustment to the power of the first signal in response the performance parameter of the second signal; and
   a means for performing a second adjustment to the power of the first signal in response the performance parameter of the third signal.

2. The system of claim 1, where the second station is a satellite.

3. The system of claim 1, wherein timing of the performance of the first adjustment is independent of timing of the performance of the second adjustment.

4. The system of claim 1, wherein the performance parameters of the second and third signals are measured repeatedly and the first and second adjustments are made repeatedly.

5. The system of claim 1, wherein the means for measuring the performance parameter of the second signal includes a weighted average of a current measurement of the performance parameter of the second signal and at least one past measurement of the performance parameter of the second signal.

6. The system of claim 1, wherein the performance parameter of the second signal is indirectly related to the performance of the first signal.

7. The system of claim 1, wherein the performance parameter of the third signal is directly related to the performance of the first signal.

8. The system of claim 1, wherein the means for performing the first adjustment is based on a first no adjust region, where the first no adjust region is a region encompassing a first nominal level for the performance parameter of the second signal, the region having an a first upper bound and a first lower bound.

9. The system of claim 8, the first adjustment is substantially zero when a current performance parameter of the second signal and a past performance parameter of the second signal and within the first no adjust region.

10. The system of claim 8, wherein the use of the first no adjust region includes relating the first adjustment to the first nominal level minus a current performance parameter of the second signal when the current performance parameter of the second signal is outside the no adjust region and a past performance parameter of the second signal is within the first no adjust region.

11. The system of claim 8, wherein the use of the first no adjust region includes relating the first adjustment to a past performance parameter of the second signal minus the first nominal level when a current performance parameter of the second signal is within the first no adjust region and the past performance parameter of the second signal is outside the first no adjust region.

12. The system of claim 8, wherein the use of the first no adjust region includes relating the first adjustment to a past performance parameter of the second signal minus a current performance parameter of the second signal when the current and the past performance parameters of the second signal are outside the first no adjust region.

13. The system of claim 1, wherein the means for performing a second adjustment is based on relating the second adjustment to the difference between a second nominal level minus a current performance parameter of the third signal.

14. The system of claim 1, wherein the means for performing a second adjustment is based on a second no adjust region, where the second no adjust region is a region encompassing a second nominal level forte performance parameter of the third signal, the region having an a second upper bound and a second lower bound.

15. The system of claim 14, the second adjustment is substantially zero when a current performance parameter of the third signal is within the second no adjust region.

16. The system of claim 14, wherein performing the second adjustment is performed in accordance with the following:

$$\left(\bigwedge_{k=0}^{N-1}(CP_m(n-k)>A)\right)\wedge(A\geq CP_m(n-N))\Rightarrow\Delta P_2=$$
$$(CP_p-CP_m(n))*W_N.$$

17. The system of claim 14, wherein performing the second adjustment is performed in accordance with the following:

$$\left(\bigwedge_{k=0}^{N-1}(CP_m(n-k)<B)\right)\wedge(B\leq CP_m(n-N))\Rightarrow\Delta P_2=$$
$$(CP_p-CP_m(n))*W_N.$$

18. A method for providing performance control of a first signal transmitted by a first station to a second station, comprising:
  measuring a performance parameter of a second signal that is transmitted to the first station from the second station;
  measuring a performance parameter of a third signal that is transmitted to the first station from the second station and is representative of the first signal as received by the second station;
  performing a first adjustment to the power of the first signal in response the performance parameter of the second signal; and
  performing a second adjustment to the power of the first signal in response the performance parameter of the third signal.

19. The method of claim 18, where the second station is a satellite.

20. The method of claim 18, where the timing of the performance of the first adjustment is independent of the performance of the second adjustment.

21. The method of claim 18, wherein the performance parameters of the second and third signals are measured repeatedly and the first and second adjustments are made repeatedly.

22. The method of claim 18, wherein the measuring of the performance parameter of the second signal includes a weighted average of a current measurement of the performance parameter of the second signal and at least one past measurement of the performance parameter of the second signal.

23. The method of claim 18, wherein the performance parameter of the second signal is indirectly related to the performance of the first signal.

24. The method of claim 18, wherein the performance parameter of the third signal is directly related to the performance of the first signal.

25. The method of claim 18, wherein the performing of the first adjustment is based on a first no adjust region, where the first no adjust region is a region encompassing a first nominal level for the performance parameter of the second signal, the region having an a first upper bound and a first lower bound.

26. The method of claim 25, the first adjustment is substantially zero when a current performance parameter of the second signal and a past performance parameter of the second signal are within the first no adjust region.

27. The method of claim 25, wherein the use of the first no adjust region includes relating the first adjustment to the first nominal level minus a current performance parameter of the second signal when the current performance parameter of the second signal is outside the no adjust region and a past performance parameter of the second signal is within the first no adjust region.

28. The method of claim 25, wherein the use of the first no adjust region includes relating the first adjustment to a past performance parameter of the second signal minus the first nominal level when a current performance parameter of the second signal is within the no adjust region and the past performance parameter of the second signal is outside the first no adjust region.

29. The method of claim 25, wherein the use of the first no adjust region includes relating the first adjustment to a past performance parameter minus a current performance parameter of the second signal when the current and the past performance parameters of the second signal are outside the first no adjust region.

30. The method of claim 18, wherein the performing of a second adjustment includes relating the second adjustment to the difference between a second nominal level minus a current performance parameter of the third signal.

31. The method of claim 18, wherein the performing of a second adjustment is based on a second no adjust region, where the second no adjust region is a region encompassing a second nominal level of the performance parameter of the third signal, the region having an a second upper bound and a second lower bound.

32. The meted of claim 31, the second adjustment is substantially zero when a current performance parameter of the third signal is within the second no adjust region.

33. The method of claim 31, wherein performing the second adjustment is performed in accordance with the following:

$$\left(\bigwedge_{k=0}^{N-1}(CP_m(n-k)>A)\right)\wedge(A\geq CP_m(n-N))\Rightarrow\Delta P_2=$$
$$(CP_p-CP_m(n))*W_N.$$

34. The method of claim 31, wherein performing the second adjustment is performed in accordance with the following:

$$\left(\bigwedge_{k=0}^{N-1}(CP_m(n-k)<B)\right)\wedge(B\leq CP_m(n-N))\Rightarrow\Delta P_2=$$
$$(CP_p-CP_m(n))*W_N.$$

* * * * *

UNITED STATES PATENT AND TRADEMARK OFFICE
CERTIFICATE OF CORRECTION

| | |
|---|---|
| PATENT NO. | : 7,120,392 B2 |
| APPLICATION NO. | : 10/684147 |
| DATED | : October 10, 2006 |
| INVENTOR(S) | : Jeffrey C. Chu and Michael L. Downey |

It is certified that error appears in the above-identified patent and that said Letters Patent is hereby corrected as shown below:

Column 10, line 56, the phrase "and within" should read --are within--;
Column 11, line 18, the term "forte" should read --for the--;
Column 12, line 59, the phrase "level of" should read --level for--; and
Column 12, line 62, the term "meted" should read --method--.

Signed and Sealed this

Eighteenth Day of November, 2008

JON W. DUDAS
*Director of the United States Patent and Trademark Office*